G. C. ELLIOTT & J. W. STEINMEYER.
DROP BRAKE SHAFT MECHANISM.
APPLICATION FILED DEC. 18, 1916.
1,244,717.
Patented Oct. 30, 1917.
2 SHEETS—SHEET 1.
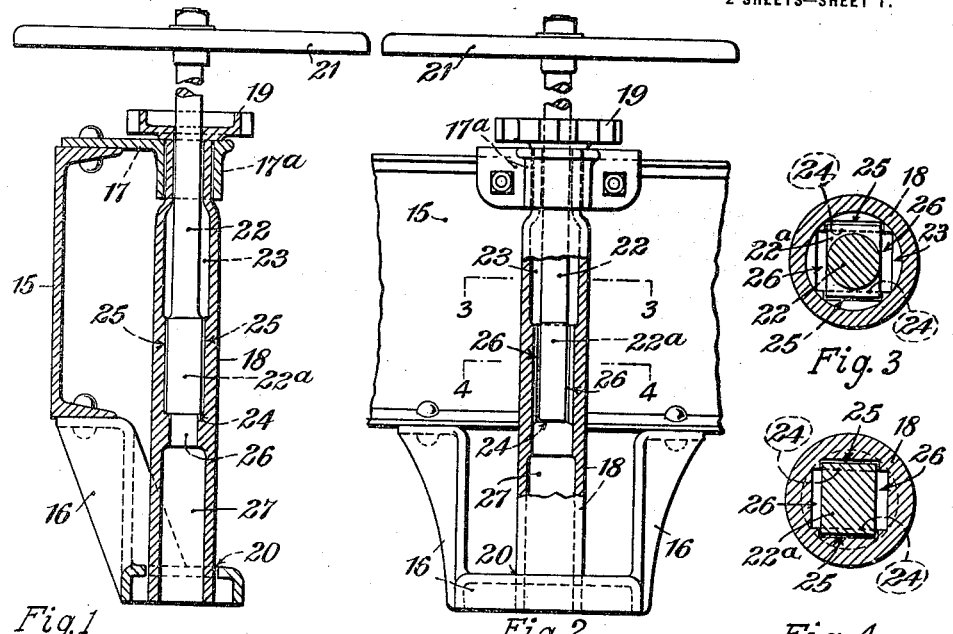
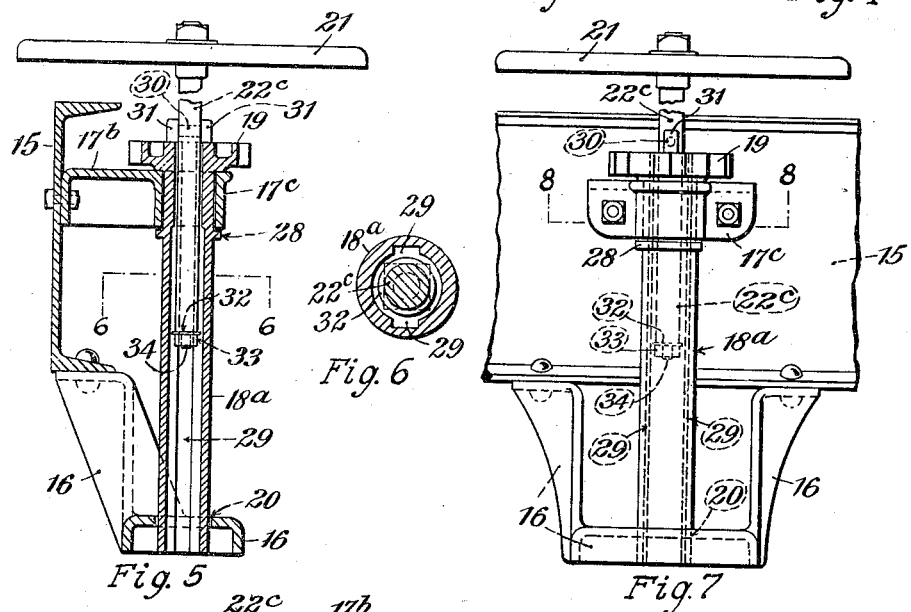
Inventor
Glenn C. Elliott
John W. Steinmeyer
by F. H. Gibbs
his Atty.

G. C. ELLIOTT & J. W. STEINMEYER.
DROP BRAKE SHAFT MECHANISM.
APPLICATION FILED DEC. 18, 1916.
1,244,717.
Patented Oct. 30, 1917.
2 SHEETS—SHEET 2.
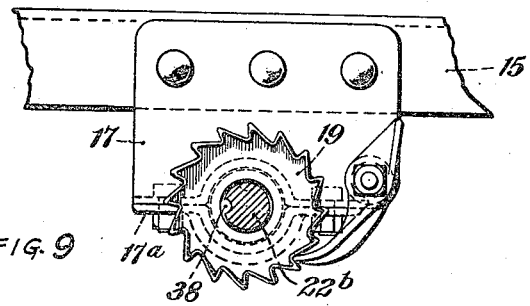
FIG. 9
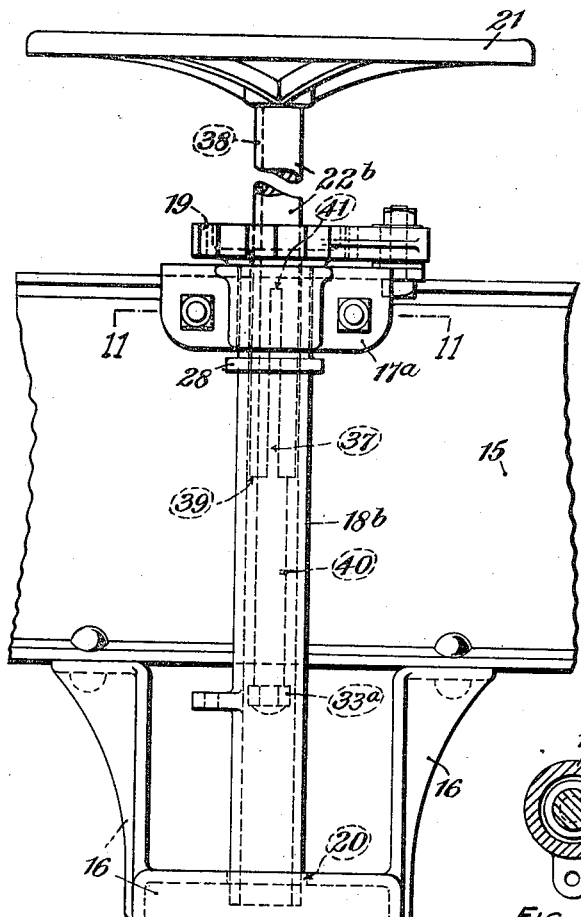
FIG. 10
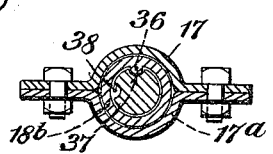
FIG. 11
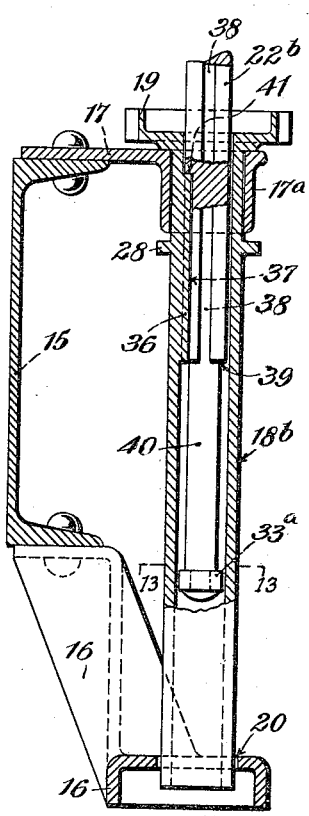
FIG. 12
FIG. 13
Inventor
Glenn C. Elliott
John W. Steinmeyer
by J. H. Gibbs
Atty.

UNITED STATES PATENT OFFICE.

GLENN C. ELLIOTT, OF MAPLEWOOD, AND JOHN W. STEINMEYER, OF ST. LOUIS, MISSOURI, ASSIGNORS TO AMERICAN CAR AND FOUNDRY COMPANY, OF ST. LOUIS, MISSOURI, A CORPORATION OF NEW JERSEY.

DROP-BRAKE-SHAFT MECHANISM.

1,244,717. Specification of Letters Patent. Patented Oct. 30, 1917.

Application filed December 18, 1916. Serial No. 137,573.

*To all whom it may concern:*

Be it known that we, GLENN C. ELLIOTT and JOHN W. STEINMEYER, residing at Maplewood, St. Louis county, Missouri, and city of St. Louis, Missouri, respectively, and being citizens of the United States, have invented certain new and useful Improvements in Drop-Brake-Shaft Mechanism, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is principally a vertical section of one form of our improved brake shaft mechanism shown as applied to the end sill of a railway car, the brake shaft being shown in elevation;

Fig. 2 is an elevational view of the same observed at right angles to its position in Fig. 1, part of the winding sleeve being shown in section;

Fig. 3 is a horizontal section taken on the line 3—3 of Fig. 2;

Fig. 4 is another horizontal section taken in a lower plane on the line 4—4 of Fig. 2;

Fig. 5 is a view similar to Fig. 1, but illustrating a modified form of our improved brake shaft;

Fig. 6 is a horizontal section taken on the line 6—6 of Fig. 5;

Fig. 7 is an elevational view of the drop brake shaft mechanism illustrated in Fig. 5, being viewed at right angles to the structure of Fig. 5;

Fig. 8 is a horizontal section taken on the line 8—8 of Fig. 7;

Fig. 9 is a plan view of the upper bearing bracket for the winding sleeve shown in Fig. 10, showing the retroactive prevention means for said sleeve;

Fig. 10 is an elevational view of the preferred form of our drop brake shaft mechanism shown as applied to the end sill of a car;

Fig. 11 is a horizontal section taken on the line 11—11 of Fig. 10;

Fig. 12 is principally a vertical central section of the drop brake shaft mechanism, taken in a plane at right angles to the car end sill, illustrated in Fig. 10; and Fig. 13 is a horizontal section taken on the line 13—13 of Fig. 12.

The present invention relates to brake shaft mechanism wherein there is a means for the winding or the unwinding, as may be desired, of the flexible terminals of brake rigging, there being a brake shaft adapted to operate the winding means.

It is a purpose to establish a sliding relation between the winding means, which may be a sleeve or a drum, and the brake shaft so that the latter may be moved into an unobtrusive position at times when there is no desire to operate the sleeve or other winding means. Also, such correlative formations are given the sleeve and brake shaft that these elements may, by the relative sliding of them, be placed either into a position where the sleeve is adapted to be directly driven by the brake shaft, or they may be arranged so as to establish a virtual independence each of the other in so far as a driving connection between them is concerned.

Vertical disposition may be given to the brake shaft sleeve and when so arranged the peculiar construction of these members permits the brake shaft to be held in an elevated position or to be maintained in a lowered position without the aid of latches or other operable appliances. The brake shaft is therefore seen to be self-supporting.

An advantage lies in the inability of the brake shaft to accidentally shift from one of its positions to the other, deliberate and predetermined manipulation of the brake shaft being necessary to effect a change in its position. The brake shaft and sleeve are interlocking against unintentional change of relation.

Other features of novelty and merit appearing hereinafter are to be regarded as coming within the scope of the present invention.

Referring to the drawings, Figs. 1 to 4 inclusive illustrate one form of our improved drop brake shaft mechanism, which is shown as being mounted upon a channel-shaped car end sill 15. Secured to, depending from and projecting in advance of the end sill 15, is a brake shaft step 16. Suitably positioned above step 16 is a bearing bracket 17 comprising a main portion secured to the top flange of the end sill and removable cap 17a bolted or otherwise fastened to the outer end of bracket 17.

A winding sleeve or drum 18 has a lower portion extending through an opening 20 in a lower horizontal shelf-like portion of brake shaft step 16 in such manner as to be journaled therein. Sleeve 18 extends upwardly for most of its length with unchanged external diameter, but as it approaches the bearing formed by bracket 17 and its cap 17a, it reduces in diameter to form an upper cylindrical journal which is seated in the cylindrical bearing formed by bracket 17 and its cap. Winding sleeve 18 continues above its upper bearing preferably in the form of a ratchet wheel 19 fashioned integrally therewith. The under side of said ratchet wheel 19 lies on top of bearing 17 and its cap 17a in such manner that it is incapable of passing downwardly therethrough and it coöperates with the sleeve portion of major diameter to prevent any material vertical movement of winding sleeve 18.

A brake shaft 22 has its lower portion telescoped within winding sleeve 18. Brake shaft 22 is cylindrical for the major portion of its length, as seen in Fig. 3, but toward its lower extremity is provided with a rectangular cross section such as is illustrated at 22a in Fig. 4. As best shown in Fig. 3, the rectangular portion of the brake shaft has a thickness in one direction corresponding to the diameter of the cylindrical portion of the shaft, but in a direction at right angles to the first mentioned direction, said rectangular portion is of greater width than said cylindrical brake shaft portion.

Brake shaft step 16 and upper bearing bracket 17 with its cap 17a being attached to the end sill 15 in the course of the construction of the underframe, winding sleeve 18 may be mounted in the brake shaft step 16 by inserting its lower end through the bearing forming opening 20 therein. The upper reduced end of sleeve 18 may then be confined between the bracket 17 and its removable cap 17a, whereupon winding sleeve 18 will be properly attached to the car end. Brake shaft 22 may be placed in position by inserting its upper end through the lower end of sleeve 18 and passing the shaft upwardly, care being first taken to arrange the lower rectangular portion 22a of the brake shaft so that its wider thickness is alined to pass through grooves 26 in the contracted portion shown in Fig. 1 to be just below said rectangular portion 22a.

Said brake shaft 22 is drawn upwardly far enough so that its rectangular lower portion 22a is entirely confined within an upper sleeve chamber 23 where it may be revolved through, say, 90° to aline said lower portion 22a with the grooves or guideways 25. Brake shaft 22 may then be lowered so that its lower rectangular portion 22a will pass downwardly in grooves 25 until the bottom of the rectangular portion of the brake shaft rests upon shoulders 24. Said brake shaft will then be held in an elevated position. A suitable hand-wheel 21 may then be attached to its upper end which projects above ratchet wheel 19.

With the parts so assembled, brake shaft 22 may be revolved by the proper turning of hand-wheel 21 and its lower rectangular portion 22a being seated in grooves or guideways 25 of sleeve 18 coöperates with the walls of said grooves or guideways to establish a driving connection between the brake shaft and the winding sleeve 18. Because of this driving connection between the brake shaft and sleeve, the flexible ends or chains of the brake rigging with which the car is equipped may be wound or unwound upon sleeve 18.

There are long periods during train operation when it is not desired to disturb the brake rigging and it is preferred to lower the brake shaft to an unobtrusive position. To accomplish this, brake shaft 22 must first be raised until its lower rectangular portion 22a is entirely within the upper sleeve chamber 23, after which it may be given a quarter revolution to aline brake shaft rectangular portion 22a with grooves or guideways 26, after which brake shaft 22 and its hand-wheel 21 may be lowered, the rectangular brake shaft portion 22a passing down through guideways 26 into the lower sleeve chamber 27 in which the rectangular brake shaft portion is housed when the brake shaft is in its lowered position. Whenever it is desired to raise the brake shaft to place it in driving relation to sleeve 18, it is simply raised through guideways 26, the necessary alining of the lower brake shaft portion 22a, of course, being made until said rectangular portion is again within upper sleeve chamber 23. As before, the brake shaft is given a quarter revolution to aline its rectangular portion 22a with grooves or guideways 25, after which it is lowered to be seated as shown in Fig. 1. It is obvious that no change of position of the brake shaft can take place until its lower rectangular portion is once more raised to the upper sleeve chamber 23. This requires a deliberate and intentional manipulation of the brake shaft and there is no possibility of an accidental change of position of said brake shaft.

Figs. 5 to 8 inclusive illustrate another form of our drop brake shaft mechanism in which the brake shaft step 16 is mounted on the lower portion of the car end sill 15 and the upper bearing bracket 17$^b$ is secured to the web of the end sill. As shown in Fig. 8, bearing bracket 17$^b$ forms only part of the bearing for the upper end of winding sleeve 18$^a$ and is provided with a removable cap 17$^c$ which is bolted to bracket 17$^b$ to complete said upper sleeve bearing.

Winding sleeve 18$^a$ is journaled in brake shaft step 16 in substantially the same manner as it was in the previous form and at its upper extremity said sleeve is provided with an integral ratchet wheel 19. Sufficiently below ratchet wheel 19 to preserve a good running fit between the bracket and sleeve 18$^a$, is a collar 28 preferably formed integrally with sleeve 18$^a$. Ratchet wheel 19 and collar 28 prevent vertical travel of the winding sleeve 18$^a$.

The interior of sleeve 18$^a$ from its lower extremity upwardly to just above collar 28 is cylindrical, as shown in Fig. 6. From this point to the upper surface of ratchet wheel 19, the interior of sleeve 18$^a$ is square. The cylindrical and square cross sectional interior contours of sleeve 18$^a$ are, however, modified by the presence of diametrically opposed grooves or guideways 29 extending the entire length of sleeve 18$^a$, including its integral ratchet wheel 19. The purpose of these guideways 29 will be presently set forth.

A brake shaft 22$^c$ is arranged to telescope within sleeve 18$^a$. This brake shaft is square in cross section throughout the major portion of its length, but its lower end is cylindrical, as shown in Fig. 6, from the bottom of said brake shaft 22$^c$ upwardly for a distance slightly in excess of the square portion of the bore of sleeve 18$^a$. In assembling, brake shaft 22$^c$ is inserted through the bottom of sleeve 18$^a$ and passed upwardly, a washer being secured to its lower extremity by a nut 33 threaded onto a reduced end 34 of said brake shaft 22$^c$. Said brake shaft 22$^c$ is drawn upwardly until washer 32 encounters the lower end of the squared portion of sleeve 18$^a$, whereupon a further upward movement of brake shaft 22$^c$ is prevented.

A rivet or bolt 30 is then passed through an opening in brake shaft 22$^c$ and is provided with heads 31 adapted to rest upon the upper surface of ratchet wheel 19 when the brake shaft is in its normal upper position. It may be noted that rivet 30 is, in effect, an integral part of the brake shaft 22$^c$, but is applied as shown because it is more economical to construct the brake shaft in this manner.

When the heads 31 of brake shaft-carried bolt 30 rest on top of ratchet wheel 19, enough of the squared portion of brake shaft 22$^c$ extends into sleeve 18$^a$ to make engagement with said squared bore portion of said sleeve 18$^a$ throughout its entire length. A driving connection is thereby established between brake shaft 22$^c$ and the winding sleeve 18$^a$ so that manipulation of handwheel 21 will cause a rotation of sleeve 18$^a$ in either desired direction to wind or unwind the brake chains.

It being desired to lower the brake shaft and its hand-wheel 21, it is first necessary to raise said brake shaft until its lower cylindrical portion extends through the upper square bore of sleeve 18$^a$, at which time, and not until then, brake shaft 22$^c$ may be given a partial rotation, say a quarter turn, to aline the heads 31 of bolt 30 with the guideways 29 that extend throughout the length of sleeve 18$^a$. After such alinement of bolt heads 31 with guideways 29, brake shaft 22$^c$ may be lowered. Again desiring to raise the brake shaft, it is drawn upwardly, washer 32 preventing its withdrawal from sleeve 18$^a$. Said brake shaft is then revolved 90° and again lowered, heads 31 of bolt 30 again reëngaging the upper surface of ratchet wheel 19 and the lower part of the squared portion of the brake shaft 22$^c$ again coming into driving relation with the squared internal portion of sleeve 18$^a$, reëstablishing the driving connection between the brake shaft and sleeve 18$^a$.

We illustrate our preferred form in Figs. 9 to 13 inclusive, the drop brake shaft mechanism being mounted on a channel-shaped car end sill 15 in the same manner as it was mounted in the form illustrated in Figs. 1 and 2. Sleeve 18$^b$ is principally cylindrical internally and externally, the bore of said sleeve 18$^b$ being of uniform diameter from end to end, except where it is expanded to form the rim of ratchet wheel 19 and where the feather 36 is present. As in the form illustrated in Figs. 5 and 7, the winding sleeve 18$^b$ is prevented from having vertical travel by the ratchet wheel 19 and the integral collar 28.

A brake shaft 22$^b$ has a portion telescopically arranged within sleeve 18$^b$, said brake shaft being provided with a major portion of a diameter substantially corresponding to the internal diameter of sleeve 18$^b$ and a lower portion 40 of sufficiently reduced diameter to clear feather 36 in sliding vertically of sleeve 18$^b$. Lower brake shaft portion 40 abruptly joins the upper part of the brake shaft that is of larger diameter so as to form an annular shoulder 39. The upper portion of brake shaft 22$^b$ that is of larger diameter than its lower portion 40, is provided with grooves or guideways 37 and 38, the guideways 37 extending from brake shaft shoulder 39 upwardly for a distance approximately equal to the vertical length of feather 36, terminating at its upper end in an abrupt shoulder 41. The other groove or guideway 38 is co-extensive with the length of the upper brake shaft portion of larger diameter. The lower extremity of the reduced portion 40 of brake shaft 22ᵇ is further reduced to receive a washer or collar 33ᵃ, the portion over which said washer or collar 33ᵃ is slipped, extending below said washer or collar and being upset to form a retaining head.

Brake shaft step 16 and bracket 17 and its removable cap 17ᵃ being assembled with the car end sill 15 during the course of construction, sleeve 18ᵇ is mounted therein as described in connection with Figs. 5 and 7. The brake shaft 22ᵇ is, as before, inserted through the bottom of sleeve 18ᵇ and passed upwardly. Groove or guideway 38 is alined with feather 36 to permit the continued upward movement of brake shaft 22ᵇ, this movement being carried on until the shoulder 39 of the brake shaft is carried above the upper end of feather 36. Thereafter, brake shaft 22ᵇ is given, say, a quarter revolution to aline its shorter groove or guideway 37 with feather 36, said brake shaft being then lowered until shoulder 41 at the upper extremity of guideway 37 rests on top of feather 36. Brake shaft 22ᵇ will then be supported in its upper position and on account of the interlocking of the feather and the wall of guideway 37 will be incapable of independent rotation within sleeve 18ᵇ. A driving connection between brake shaft 22ᵇ and sleeve 18ᵇ is therefore established. Hand-wheel 21 may then be mounted upon the upper extremity of brake shaft 22ᵇ in any approved manner. Such times as it is desired to maintain the driving connection between the brake shaft and the chain winding sleeve 18ᵇ, the parts are left in the positions shown.

Occasion arising for the lowering of the brake shaft 22ᵇ, it must of necessity be raised sufficiently to carry its shoulder 39 above the top of feather 36, after which it may be rotated to bring the lower ends of guideway 38 into alinement with feather 36, after which it may be slid downwardly until the bottom of the hand-wheel engages ratchet wheel 19, or other stop.

From the foregoing it will be readily appreciated that we have devised a drop brake shaft mechanism which is extremely simple in construction, comprises few parts and is not dependent upon latches or other extraneous devices to maintain the brake shaft in either of its positions, said brake shaft being self-supported. It also has the advantage of cheapness in manufacture and reliability in operation, as well as possessing the virtue of being capable of being interlocked to prevent accidental derangement.

What we claim is:

1. In combination in a drop brake shaft mechanism, a sleeve and a slidable brake shaft adapted to operate the same and to co-act directly therewith to be maintained in either operative or inoperative relation with said sleeve.

2. In combination in a brake shaft mechanism, a sleeve and a slidable brake shaft each formed to act as a unit, said shaft being adapted to operate said sleeve and to be maintained by the sleeve in operative and inoperative relation therewith.

3. In combination in a drop brake shaft mechanism, a sleeve and a brake shaft relatively movable with respect to each other and interdependent upon each other to assume both coöperative and independent relations.

4. In combination in a drop brake shaft mechanism, a sleeve and a slidable brake shaft, one having a formation so related to that of the other that said shaft is held in driving relation to said sleeve in one position but which are capable of rearrangement to otherwise position said shaft and cause it to be non-sleeve-driving.

5. In combination in a drop brake shaft mechanism, a sleeve and a slidable brake shaft each so formed that said shaft is held in an elevated sleeve-driving position by said sleeve, said shaft being operable to assume a sleeve-non-driving position.

6. In combination in a drop brake shaft mechanism, a sleeve and a brake shaft in slidable relation, and coöperative means on said sleeve and shaft obstructing and permitting relative sliding between said shaft and sleeve, said means being adapted to be arranged by movement of said shaft to prevent or permit such relative sliding.

7. In combination in a drop brake shaft mechanism, a sleeve and a brake shaft, guides and seating portions arranged on said sleeve and shaft under control of the shaft, whereby said shaft may be seated and held elevated and by its own manipulation be unseated, and given a lower position.

8. In combination in a drop brake shaft mechanism, a sleeve, a brake shaft slidable therein, shaft actuated guiding and seating means arranged on said sleeve and shaft, and shaft-retaining means, whereby said shaft may be seated and held elevated and by its own manipulation be unseated, and given a lower position and held from separation from said sleeve.

9. In combination in a drop brake shaft mechanism, a revoluble sleeve, bearing means therefor preventing substantial longitudinal movement thereof, a brake shaft slidable in said sleeve, guiding and seating means on said sleeve and shaft subject to different mutual relations by actuation of the shaft to cause said shaft to be held elevated and to permit it to be lowered and supported.

10. In combination in a drop brake shaft mechanism, a revoluble sleeve and a brake shaft telescopically combined, one being provided with a guideway and the other with a member adapted to relatively slide therein, and means normally preventing relative sliding of said shaft and sleeve, said shaft being capable of actuation to correlate said member and guideway to permit the sliding of said shaft to different positions to, respectively, drive and release said sleeve.

11. In combination in a brake shaft mechanism, a revoluble sleeve and a brake shaft telescopically combined, shaft-and-sleeve formed means coöperating to permit relative sliding of said sleeve and shaft but preventative of relative rotation therebetween, shaft-and-sleeve formed means permitting relative rotation between said shaft and sleeve, and means so relatively positioning said shaft and sleeve that either the first or second mentioned shaft-and-sleeve formed means is effective.

12. In combination in a drop brake shaft mechanism, a revoluble sleeve and a brake shaft telescopically combined, each having portions forming a driving connection between said shaft and sleeve and other portions permitting independent rotary movement of said shaft and means for holding said shaft elevated in the indicated driving relation with said sleeve, said shaft being adapted by manipulation to be slid to a lower non-sleeving-driving position.

13. In combination in a drop brake shaft mechanism, a revoluble sleeve and a brake shaft slidable therein, each having portions adapted to engage to cause said shaft to drive said sleeve, said sleeve having a portion in which said shaft may turn without driving the sleeve, portions of said sleeve and shaft being adapted to hold said shaft elevated in driving relation with said sleeve, said shaft being adapted to be raised out of said driving relation and lowered to a non-sleeve-driving position.

14. In combination in a drop brake shaft mechanism, a revoluble sleeve and a brake shaft slidable therein, each having portions adapted to engage to cause said shaft to drive said sleeve, said sleeve having a portion in which said shaft may turn without driving the sleeve, portions of said sleeve and shaft being adapted to hold said shaft elevated in driving relation with said sleeve, said shaft being adapted to be raised out of said driving relation and lowered to a non-sleeve-driving position, and means for preventing excessive raising of said shaft.

15. In combination in a drop brake shaft mechanism, a revoluble sleeve and a brake shaft slidable therein each having, or having in effect, integral portions by means of which said shaft may be held elevated and in driving relation with said sleeve and retro-action means for said sleeve partly integral therewith.

16. In combination in a drop brake shaft mechanism, a revoluble sleeve and a brake shaft so formed as to of themselves coöperate to hold said shaft elevated and in driving relation with said sleeve or to permit said shaft to slide to a lower non-sleeve-driving position.

17. In combination in a drop brake shaft mechanism, a revoluble sleeve and a brake shaft so formed as to of themselves coöperate to hold said shaft elevated and in driving relation with said sleeve or to permit said shaft to slide to a lower non-sleeve-driving position, and means forming bearings for said sleeve adapted to support the latter from car structure.

18. In combination in a drop brake shaft mechanism, a revoluble sleeve and a brake shaft so formed as to of themselves coöperate to hold said shaft elevated and in driving relation with said sleeve or to permit said shaft to slide to a lower non-sleeve-driving position, car-supported means forming a bearing for said sleeve and means preventing substantial longitudinal movement of said sleeve.

19. In combination in a drop brake shaft mechanism, a revoluble sleeve and a brake shaft so formed as to coöperate without an additional shaft-supporting device to hold said shaft elevated and in driving relation with said sleeve or to permit said shaft to slide to a lower non-sleeve-driving position, and a divisible bearing for said sleeve.

20. In combination in a brake shaft mechanism, a relatively slidable revoluble sleeve and a brake shaft, both provided with curved and uncurved portions and portions for mutual engagement, whereby said brake shaft may be maintained in different relations to said sleeve.

21. In combination in a brake shaft mechanism, a relatively slidable revoluble sleeve and a brake shaft, both provided with curved and uncurved portions and portions for mutual engagement, whereby said brake shaft may be maintained in different relations to said sleeve and interlocked against unintentional change in mutual relation.

In witness whereof we have hereunto set our hands in the presence of two witnesses.

GLENN C. ELLIOTT.
JOHN W. STEINMEYER.

Witnesses:
OSCAR HOCHBERG,
CHRISTIAN GARNESS.